US012675320B2

(12) United States Patent
Zhang

(10) Patent No.: US 12,675,320 B2
(45) Date of Patent: Jul. 7, 2026

(54) TASK SCHEDULING METHOD AND APPARATUS

(71) Applicant: HUAWEI TECHNOLOGIES CO., LTD., Shenzhen (CN)

(72) Inventor: Hailiang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 501 days.

(21) Appl. No.: 18/191,151

(22) Filed: Mar. 28, 2023

(65) Prior Publication Data

US 2023/0229495 A1    Jul. 20, 2023

Related U.S. Application Data

(63) Continuation of application No. PCT/CN2021/120360, filed on Sep. 24, 2021.

(30) Foreign Application Priority Data

Sep. 29, 2020    (CN) ......................... 202011053405.3

(51) Int. Cl.
*G06F 9/48*        (2006.01)

(52) U.S. Cl.
CPC .................................. *G06F 9/4881* (2013.01)

(58) Field of Classification Search
CPC .................................................... G06F 9/4881
See application file for complete search history.

(56) References Cited

U.S. PATENT DOCUMENTS

2018/0131979 A1 *    5/2018    Bayoumi .............. G06F 9/5027
2020/0042349 A1      2/2020    Jain et al.

FOREIGN PATENT DOCUMENTS

| CN | 103605567 A | 2/2014 |
| CN | 108268310 A | 7/2018 |
| CN | 108595249 A | 9/2018 |
| CN | 109684060 A | 4/2019 |
| CN | 111400087 A | 7/2020 |
| CN | 111488210 A | 8/2020 |
| WO | 2020072155 A1 | 4/2020 |

OTHER PUBLICATIONS

Extended European Search Report issued in EP21874357.3, dated May 3, 2024, 14 pages.
International Search Report and Written Opinion issued in PCT/CN2021/120360, dated Dec. 28, 2021, 10 pages.
Office Action issued in CN202011053405.3, dated Dec. 23, 2024, 9 pages.

* cited by examiner

*Primary Examiner* — Wissam Rashid

(57) ABSTRACT

When scheduling a task to be executed by a target virtual machine, a scheduler first obtains at least one top-priority task in a to-be-executed task queue of the first target virtual machine to first ensure that the top-priority task is preferentially executed, determines a first task with a minimum virtual runtime from the at least one top-priority task, and controls the target virtual machine to execute the first task. This ensures fair task scheduling of at least one task with the same priority. The scheduler can ensure both preferential scheduling of a high-priority task and fair scheduling of tasks with the same priority when scheduling the task on the first target virtual machine.

15 Claims, 8 Drawing Sheets

| Virtual machine 1 | Virtual machine 2 (virtual machine 4) | Virtual machine 3 |
|---|---|---|
| | Operating system | |
| | System resource | |

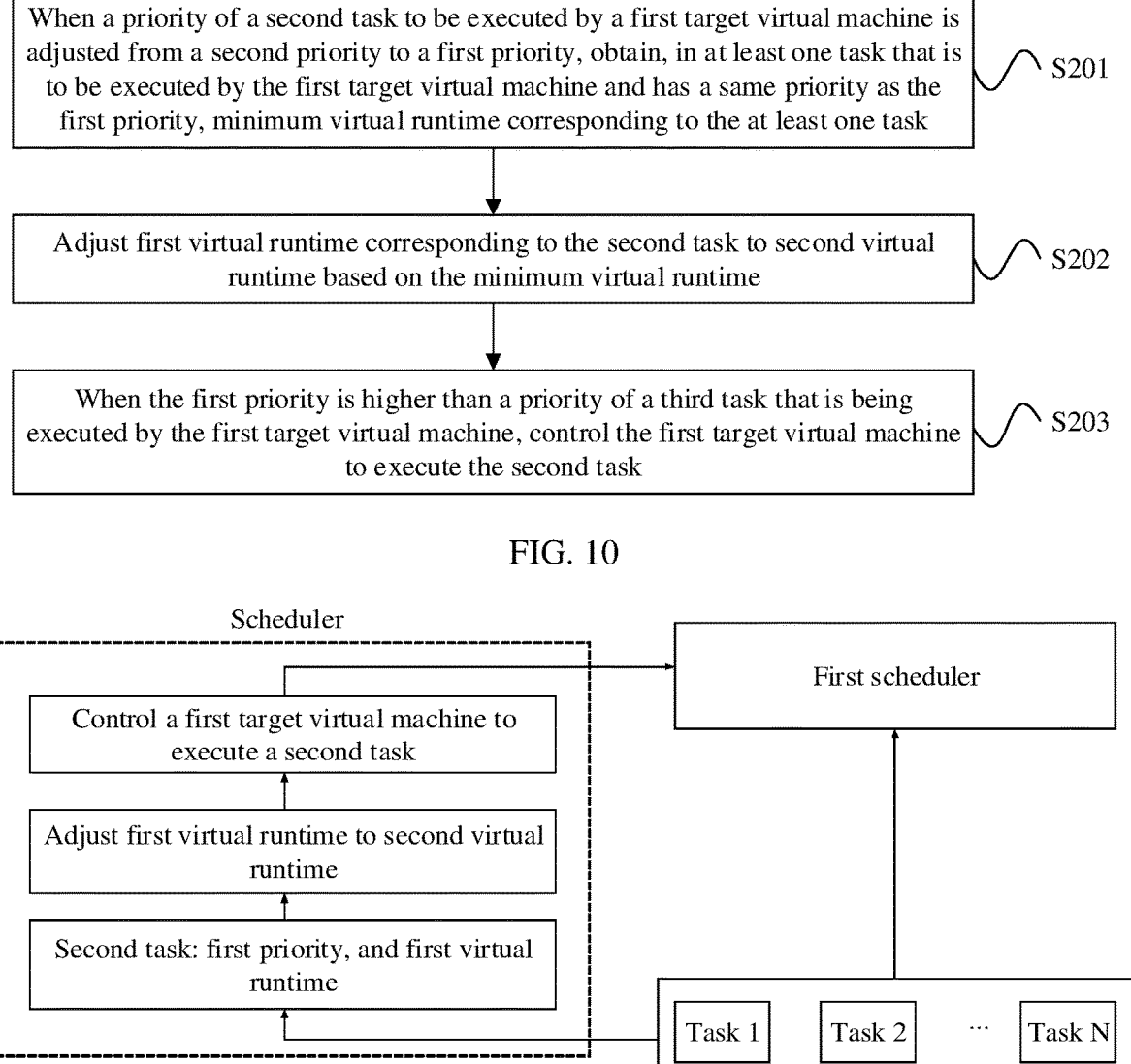

When a priority of a second task to be executed by a first target virtual machine is adjusted from a second priority to a first priority, obtain, in at least one task that is to be executed by the first target virtual machine and has a same priority as the first priority, minimum virtual runtime corresponding to the at least one task   S201

Adjust first virtual runtime corresponding to the second task to second virtual runtime based on the minimum virtual runtime   S202

When the first priority is higher than a priority of a third task that is being executed by the first target virtual machine, control the first target virtual machine to execute the second task   S203

FIG. 10

Scheduler

Control a first target virtual machine to execute a second task

Adjust first virtual runtime to second virtual runtime

Second task: first priority, and first virtual runtime

First scheduler

Task 1 Task 2 ··· Task N

FIG. 11

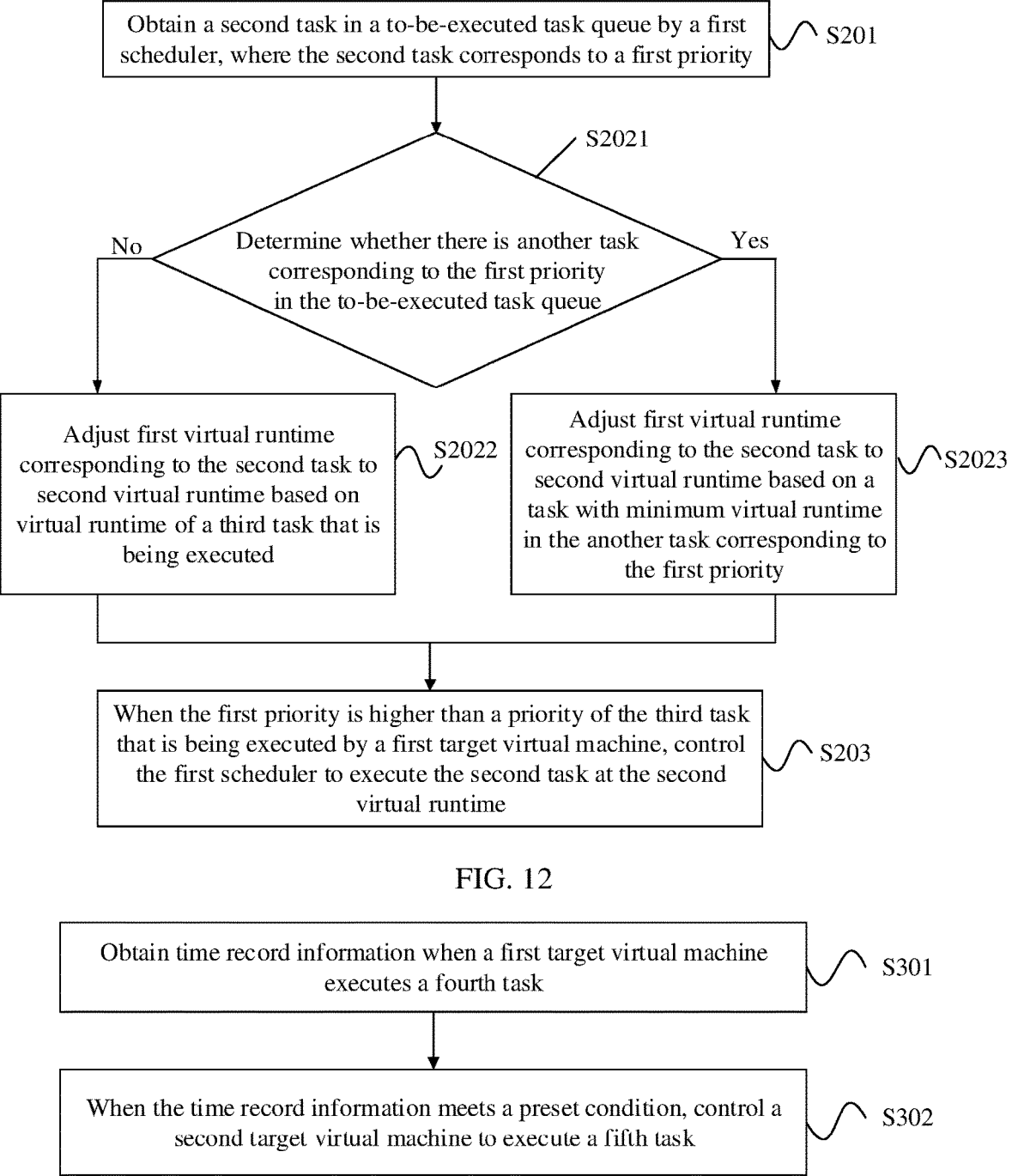

Obtain a second task in a to-be-executed task queue by a first scheduler, where the second task corresponds to a first priority — S201

S2021

Determine whether there is another task corresponding to the first priority in the to-be-executed task queue No                                                    Yes Adjust first virtual runtime corresponding to the second task to second virtual runtime based on virtual runtime of a third task that is being executed — S2022

Adjust first virtual runtime corresponding to the second task to second virtual runtime based on a task with minimum virtual runtime in the another task corresponding to the first priority — S2023

When the first priority is higher than a priority of the third task that is being executed by a first target virtual machine, control the first scheduler to execute the second task at the second virtual runtime — S203

FIG. 12

Obtain time record information when a first target virtual machine executes a fourth task — S301

When the time record information meets a preset condition, control a second target virtual machine to execute a fifth task — S302

FIG. 13

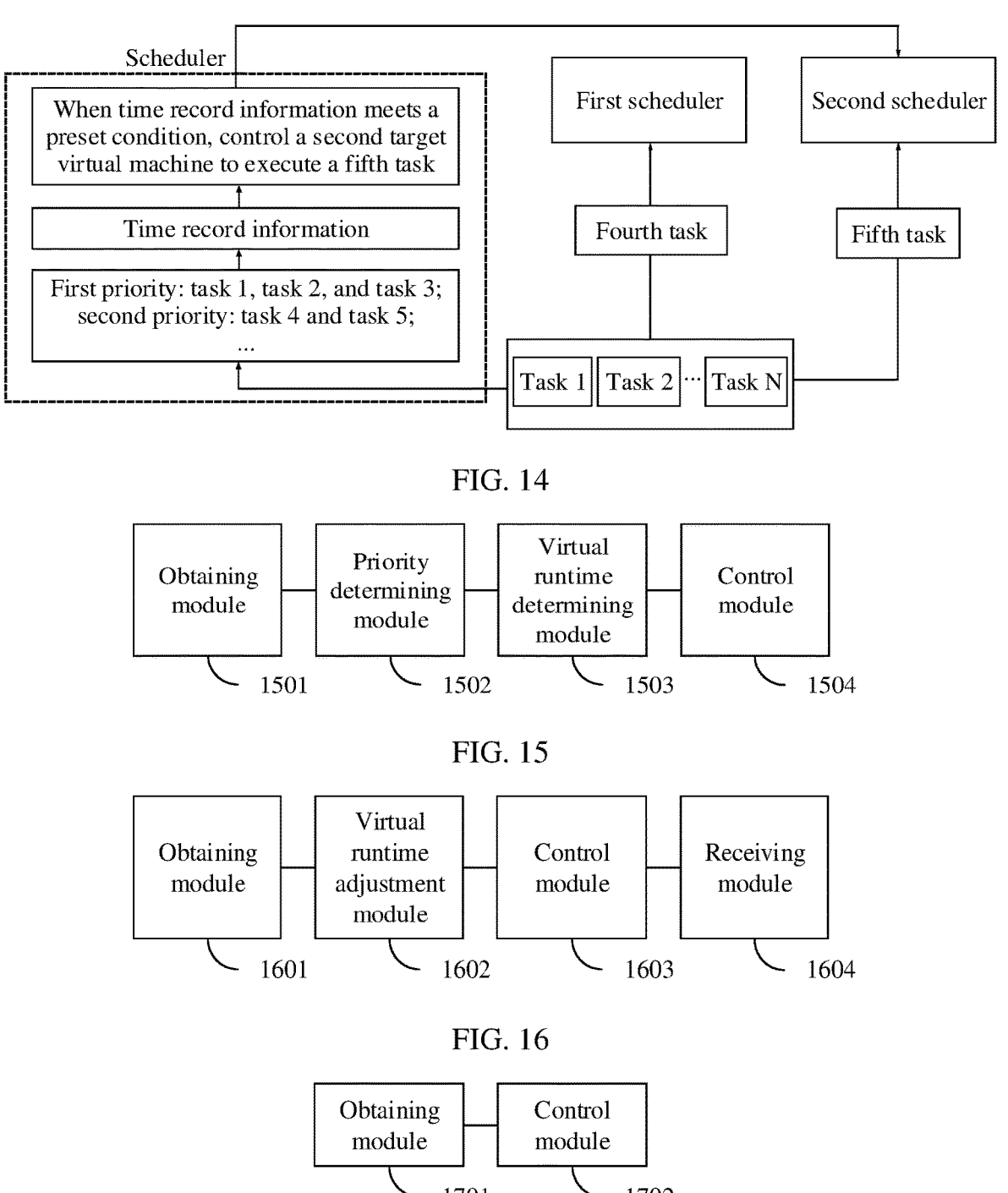

Scheduler

When time record information meets a preset condition, control a second target virtual machine to execute a fifth task Time record information First priority: task 1, task 2, and task 3; second priority: task 4 and task 5; ...

First scheduler

Second scheduler

Fourth task

Fifth task

Task 1 | Task 2 | ··· | Task N

FIG. 14

Obtaining module            1501

Priority determining module            1502

Virtual runtime determining module            1503

Control module            1504

FIG. 15

Obtaining module            1601

Virtual runtime adjustment module            1602

Control module            1603

Receiving module            1604

FIG. 16

Obtaining module            1701

Control module            1702

FIG. 17

TASK SCHEDULING METHOD AND APPARATUS

CROSS-REFERENCE TO RELATED APPLICATIONS

This application is a continuation of International Application No. PCT/CN2021/120360, filed on Sep. 24, 2021, which claims priority to Chinese Patent Application No. 202011053405.3, filed on Sep. 29, 2020. The disclosures of the aforementioned applications are hereby incorporated by reference in their entireties.

TECHNICAL FIELD

The present disclosure relates to the field of computer technologies, and in particular, to a task scheduling method and apparatus.

BACKGROUND

In the field of computers, virtual machine technologies allow a server to run a plurality of operating systems at the same time. Each operating system may run as a virtual machine in an independent environment without affecting each other. Therefore, more and more service providers provide virtual machine services, and users can use computing services provided by virtual machines of the service providers. However, for a service provider, virtual machines used by different users may run on the same server, so that utilization of the server deployed by the service provider is greatly improved. In addition, a user usually applies for a virtual machine resource based on a peak value of a required computation amount when using a virtual machine provided by a service provider, and the service provider also allocates a server resource to different virtual machines based on the peak value of the computation amount. However, in actual use, a user usually does not use all virtual machine resources that the user applies for, and consequently, utilization of virtual machine resources allocated by a server to each user is low.

Therefore, in conventional technologies, a service provider may allow execution of tasks of different users in the same virtual machine resource allocated to the users to ensure more proper use of limited resources in a server. Different users correspond to different task types and different priorities, so that a scheduler may be deployed in the server to uniformly manage and schedule the tasks that need to be executed in the virtual machine resource. 1: In an implementation, the scheduler manages, by using a completely fair scheduling policy, tasks executed in a virtual machine. The scheduler allocates different execution time for all the tasks executed in the virtual machine based on a priority weight value of each task, thereby ensuring that all the tasks are executed. However, such a scheduler can only ensure allocation of more execution time for a higher-priority task, but cannot ensure that the higher-priority task is preferentially scheduled and that a high-priority task preempts a low-priority task for execution. 2: In another implementation, the scheduler manages, by using a real-time scheduler policy, tasks executed in a virtual machine. The scheduler first executes, based on priorities of all tasks, a task that first enters a queue in top-priority tasks, or executes a plurality of top-priority tasks in turn. However, such a scheduler can execute a lower-priority task only after completing execution of a higher-priority task, and thus can neither ensure fair scheduling of tasks with a same priority nor solve starvation of the low-priority task caused by scheduling.

To sum up, in conventional technologies, both the completely fair scheduling policy and the real-time scheduler policy have disadvantages. When different types of tasks can be executed on a virtual machine, it is impossible to meet preferential scheduling of a high-priority task and ensure fairness that a low-priority task is also scheduled. Therefore, how to design a scheduler capable of scheduling tasks of different priorities executed on a virtual machine and meeting scheduling fairness is a technical problem urgent to be resolved in this field.

SUMMARY

The present disclosure provides a task scheduling method and apparatus, so that a scheduler can ensure both preferential scheduling of a high-priority task and fair scheduling of tasks with a same priority when scheduling a task to be executed by a virtual machine.

A first aspect of the present disclosure provides a task scheduling method, so that when a scheduler schedules a task to be executed by a first target virtual machine, a requirement for a priority of the scheduled task can be met, and fair task scheduling can be ensured.

When scheduling the task to be executed by the first target virtual machine, the scheduler first obtains at least one top-priority task in a to-be-executed task queue of the first target virtual machine to first ensure that the top-priority task is preferentially executed, then further determines a first task with a minimum virtual runtime from the at least one top-priority task, and finally controls the first target virtual machine to execute the first task. In this way, fair task scheduling of at least one task with the same priority is ensured. That is, in this embodiment, the scheduler can ensure both preferential scheduling of a high-priority task and fair scheduling of tasks with a same priority when scheduling the task on the first target virtual machine.

In an embodiment of the first aspect of the present disclosure, the scheduler that is used as an execution body may schedule a plurality of virtual machines at the same time, and when the scheduler schedules a task executed by the first target virtual machine in the plurality of virtual machines, scheduling may be implemented by controlling a first scheduler of the first target virtual machine. For example, the scheduler may determine, by using a to-be-executed task queue stored in the first scheduler, priorities of a plurality of tasks to be executed by the first target virtual machine. For another example, when controlling the first target virtual machine to execute the first task, the scheduler may specifically adjust a sequence of a to-be-executed task queue in the first scheduler to adjust the first task to the front of the to-be-executed task queue.

The present disclosure provides at least the following three specific implementations of determining, by the scheduler, the at least one top-priority task in the tasks to be executed by the first target virtual machine.

In a first manner provided in an embodiment of the first aspect of the present disclosure, based on that the first scheduler stores the to-be-executed task queue of the first target virtual machine, when determining the at least one top-priority task, the scheduler may obtain all the tasks in the to-be-executed task queue from the first scheduler, then determine priorities corresponding to all the tasks, and finally determine the at least one top-priority task.

In a second manner provided in an embodiment of the first aspect of the present disclosure, when scheduling the to-be-executed tasks of the first target virtual machine, the first scheduler not only stores all the to-be-executed tasks, but also records priorities of all the tasks in the queue, for example, records the priorities in a table. In this case, when determining the priorities of the to-be-executed tasks of the first target virtual machine, the scheduler may directly obtain, from the table, the priorities corresponding to all the tasks, instead of obtaining each task, thereby reducing a computation amount and improving efficiency.

In a third manner provided in an embodiment of the first aspect of the present disclosure, when scheduling the to-be-executed tasks of the first target virtual machine, the first scheduler may set a plurality of different queues to store the tasks, and priorities of tasks stored in the queues are different. In this case, when determining the at least one top-priority task in the to-be-executed tasks of the first target virtual machine, the scheduler may directly obtain the at least one task from a queue with a top priority in the first scheduler, without processing a task with another priority in another queue. This can also reduce the computation amount and improve efficiency.

A second aspect of the present disclosure provides a task scheduling method, so that when a scheduler schedules a task executed by a first target virtual machine, if a priority of a task in a to-be-executed task queue of the first target virtual machine is adjusted, the scheduler adjusts a virtual runtime of the task based on a priority of the task after priority adjustment. In this way, a high-priority task preempts a task currently executed by the first target virtual machine, so as to meet dynamic scheduling of the task executed by the first target virtual machine.

It is assumed that the first target virtual machine is executing a third task. In this case, if a priority of a second task in the to-be-executed tasks of the first target virtual machine is adjusted, for example, adjusted from a second priority to a first priority, a virtual runtime of the second task is adjusted, for example, adjusted from a first virtual runtime to a second virtual runtime, based on a minimum virtual runtime in at least one task that is to be executed by the first target virtual machine and has a same priority as the first priority. Finally, when the priority of the second task is higher than a priority of the third task, the scheduler controls the first target virtual machine to execute the second task. Therefore, the second task preempts the task currently executed by the first target virtual machine for execution, and dynamic scheduling of the task is implemented.

In an embodiment of the second aspect of the present disclosure, when the scheduler adjusts the virtual runtime of the second task, an adjustment objective is to adjust the second virtual runtime after adjustment to be greater than the minimum virtual runtime in virtual runtime of the at least one task corresponding to the first priority in all to-be-executed tasks of the first target virtual machine. That is, the virtual runtime of the second task is adjusted, so that the virtual runtime of the second task is as short as possible, but cannot be less than minimum virtual runtime in the same priority.

In an embodiment of the second aspect of the present disclosure, the scheduler specifically determines, based on indication information sent by a user, that the priority of the second task needs to be adjusted, so that after the user adjusts the to-be-executed task of the first target virtual machine by using the scheduler, the scheduler may adjust the virtual runtime of the task. In this way, the user can dynamically adjust the task, application scenarios can be enriched, and user experience can be improved.

In an embodiment of the second aspect of the present disclosure, when adjusting the virtual runtime of the second task, the scheduler specifically adds a minimum virtual runtime minB in the same priority to the first virtual runtime Ta of the second task before adjustment, and then subtracts a minimum value, denoted as minA, in virtual runtime of at least one task corresponding to the second priority. That is, the first virtual runtime is adjusted to the second virtual runtime by using a formula: the second virtual runtime= (Ta+minB)−minA. Therefore, the second virtual runtime after adjustment is slightly greater than the minimum value in the virtual runtime of the at least one task with the first priority in the task corresponding to the first priority.

A third aspect of the present disclosure provides a task scheduling method, applied to a case in which a low-priority task in a to-be-executed task queue of a first target virtual machine is always not executed when a scheduler schedules a task in the first target virtual machine. In this case, the low-priority task may be actively migrated to another virtual machine (denoted as a second target virtual machine) for execution. Therefore, a starvation problem of a low-priority task caused by preferential scheduling of a high-priority task during execution of tasks of a plurality of priorities by the first target virtual machine is prevented.

When the first target virtual machine executes a fourth task, the scheduler obtains time record information for the fourth task in a first scheduler of the first target virtual machine, determines, based on the time record information, whether the starvation problem occurs in a fifth task of a relatively low priority, and after the time record information meets a preset condition, controls the first scheduler of the first target virtual machine to send the fifth task to a second scheduler of the second target virtual machine, so that the second target virtual machine executes the fifth task. Therefore, scheduling of the fifth task between different virtual machines is implemented, the fifth task is prevented from staying in the to-be-executed queue in the first scheduler because of the relatively low priority, and the starvation problem is prevented.

More specifically, the time record information provided in the present disclosure may include at least the following two possible implementations.

In an embodiment of the third aspect of the present disclosure, in one possible implementation, the time record information may be used to record execution time for which the first target virtual machine has executed the fourth task. In this case, the preset condition may be that the execution time of the fourth task is less than a first threshold. The starvation problem of the fifth task caused by the fact that a priority of the fourth task is relatively high and the fifth task with the relatively low priority is always not executed can be prevented. Therefore, after determining that the execution time of the fourth task is greater than the first threshold and the preset condition is met, the scheduler may schedule the second target virtual machine to execute the fifth task.

In an embodiment of the third aspect of the present disclosure, in the other possible implementation, the time record information is used to record waiting time of the fifth task in the to-be-executed task queue in the first scheduler. In this case, the preset condition may be that the waiting time of the fifth task is greater than a second threshold. Likewise, after determining that the waiting time of the fifth task is greater than the second threshold and the preset condition is met, the scheduler may schedule the second target virtual machine to execute the fifth task, so as to prevent the starvation problem of the fifth task.

Optionally, when the scheduler schedules the second target virtual machine to execute the fifth task, the second target virtual machine may be selected with reference to a specific standard.

For example, in an embodiment of the third aspect of the present disclosure, the second target virtual machine may be determined in the following order: preferentially selecting an idle-state virtual machine in a cloud server, then selecting a virtual machine with a relatively low task priority and a relatively light load in a scheduling queue of virtual machines in the cloud server, and next selecting a virtual machine with a relatively low task priority but a relatively heavy load in the scheduling queue of the virtual machines in the cloud server or a virtual machine with a relatively high priority but a relatively light load in the scheduling queue of the virtual machines in the server.

For another example, in another embodiment of the third aspect of the present disclosure, the second target virtual machine may be a virtual machine specially deployed in the cloud server. The virtual machine is dedicated to executing, in a scenario of preventing the starvation problem, a task scheduled by the scheduler from another virtual machine. When not scheduled by the scheduler, the virtual machine does not execute another task.

A fourth aspect of the present disclosure provides a task scheduling apparatus, which may be configured to perform the task scheduling method according to the first aspect of the present disclosure. The apparatus includes an obtaining module, a priority determining module, a virtual runtime determining module, and a control module. The obtaining module is configured to obtain priorities of a plurality of tasks to be executed by a first target virtual machine. The priority determining module is configured to determine at least one top-priority task in the plurality of tasks. The virtual runtime determining module is configured to determine a first task with a minimum virtual runtime from the at least one task. The control module is configured to control the first target virtual machine to execute the first task.

In an embodiment of the fourth aspect of the present disclosure, the obtaining module is specifically configured to determine, based on a to-be-executed task queue stored in a first scheduler of the first target virtual machine, the priorities of the plurality of tasks to be executed by the first target virtual machine.

In an embodiment of the fourth aspect of the present disclosure, the obtaining module is specifically configured to traverse priorities of all tasks in the to-be-executed task queue stored in the first scheduler, and determine the at least one top-priority task from the to-be-executed task queue.

In an embodiment of the fourth aspect of the present disclosure, the obtaining module is specifically configured to determine the at least one top-priority task in the plurality of tasks based on priority record information stored in the first scheduler. The priority record information is used to record priorities of all tasks in the to-be-executed task queue in the first scheduler.

In an embodiment of the fourth aspect of the present disclosure, the obtaining module is specifically configured to determine the at least one top-priority task based on a task in a queue that is stored in the first scheduler and corresponds to a top priority. The first scheduler stores the to-be-executed tasks by using a plurality of queues. Each queue corresponds to a different priority.

A fifth aspect of the present disclosure provides a task priority adjustment apparatus, which may be configured to perform the task scheduling method provided in the second aspect of the present disclosure. The apparatus includes an obtaining module, a virtual runtime adjustment module, and a control module. The obtaining module is configured to, when a priority of a second task to be executed by a first target virtual machine is adjusted from a second priority to a first priority, obtain, in at least one task that is to be executed by the first target virtual machine and has a same priority as the first priority, a minimum virtual runtime corresponding to the at least one task. The virtual runtime adjustment module is configured to adjust a first virtual runtime corresponding to the second task to a second virtual runtime based on the minimum virtual runtime.

The control module is configured to, when the first priority is higher than a priority of a third task that is being executed by the first target virtual machine, control the first target virtual machine to execute the second task.

In an embodiment of the fifth aspect of the present disclosure, the second virtual runtime is greater than the minimum virtual runtime in one or more virtual runtimes of the at least one task corresponding to the first priority in a to-be-executed task queue stored in a first scheduler of the first target virtual machine.

In an embodiment of the fifth aspect of the present disclosure, the task priority adjustment g apparatus further includes a receiving module, configured to receive indication information, and determine, based on the indication information, to adjust the priority of the second task from the second priority to the first priority.

In an embodiment of the fifth aspect of the present disclosure, the virtual runtime adjustment module is specifically configured to add the minimum virtual runtime to the first virtual runtime, and then subtract the minimum virtual runtime in the one or more virtual runtimes of the at least one task corresponding to the second priority in the to-be-executed task queue, to obtain the second virtual runtime.

A sixth aspect of the present disclosure provides a task scheduling apparatus, which may be configured to perform the task scheduling method according to the third aspect of the present disclosure. The apparatus includes an obtaining module and a control module. The obtaining module is configured to obtain time record information stored in a first scheduler of a first target virtual machine. The time record information is used to record execution time with a fourth task, and the fourth task corresponds to a third priority. Alternatively, the time record information is used to record waiting time of a fifth task in a to-be-executed task queue stored in the first scheduler, and a priority corresponding to the fifth task is lower than the third priority. The control module is configured to, when the time record information meets a preset condition, control the first scheduler of the first target virtual machine to send the fifth task to a second scheduler of a second target virtual machine, so that the second target virtual machine executes the fifth task.

In an embodiment of the sixth aspect of the present disclosure, when the time record information is used to record the execution time of the fourth task, the preset condition includes that the execution time of the fourth task is greater than a first threshold.

In an embodiment of the sixth aspect of the present disclosure, when the time record information is used to record the waiting time of the fifth task in the to-be-executed task queue in the first scheduler, the preset condition includes that the waiting time is greater than a second threshold.

In an embodiment of the sixth aspect of the present disclosure, the second target virtual machine is an idle-state virtual machine in a plurality of virtual machines deployed on a host on which the first target virtual machine is located. Alternatively, the second target virtual machine is a virtual machine whose load is less than a third threshold in a plurality of virtual machines deployed on a host. Alternatively, the second target virtual machine is a scheduler, in a plurality of virtual machines deployed on a host, configured to execute a task of a fourth priority, where the fourth priority is lower than the third priority.

In an embodiment of the sixth aspect of the present disclosure, the second target virtual machine is a scheduler dedicated to executing the fifth task when the time record information meets the preset condition.

A seventh aspect of the present disclosure provides an electronic device, including a processor and a communication interface.

The communication interface is configured to implement connection and communication between the electronic device and a peripheral.

The processor is configured to implement the method according to any one of the first aspect, the second aspect, or the third aspect.

In a possible design, the communication apparatus further includes a memory.

The memory is configured to store a computer program. The processor executes the computer program stored in the memory, so that the apparatus performs the method according to any one of the first aspect, the second aspect, or the third aspect.

An eighth aspect of the present disclosure provides a chip, including a processor and a communication interface.

The communication interface is configured to implement communication with another device.

The processor is configured to read instructions to implement the method according to any one of the first aspect, the second aspect, or the third aspect.

A ninth aspect of the present disclosure provides a computer program product. The computer program product includes computer program code. When the computer program code is executed by a computer, the computer is enabled to perform the method according to any one of the first aspect, the second aspect, or the third aspect.

BRIEF DESCRIPTION OF DRAWINGS

FIG. 10 is a schematic flowchart of an embodiment of a task scheduling method according to the present disclosure;

FIG. 11 is a schematic diagram of a scheduling process in a task scheduling method according to the present disclosure;

FIG. 12 is a schematic flowchart of an embodiment of a task scheduling method according to the present disclosure;

FIG. 13 is a schematic flowchart of an embodiment of a task scheduling method according to the present disclosure;

FIG. 14 is a schematic diagram of a scheduling process in a task scheduling method according to the present disclosure;

FIG. 15 is a schematic diagram of a structure of an embodiment of a task scheduling apparatus according to the present disclosure;

FIG. 16 is a schematic diagram of a structure of an embodiment of a task scheduling apparatus according to the present disclosure;

FIG. 17 is a schematic diagram of a structure of an embodiment of a task scheduling apparatus according to the present disclosure.

DESCRIPTION OF EMBODIMENTS

Figures 1, 2:
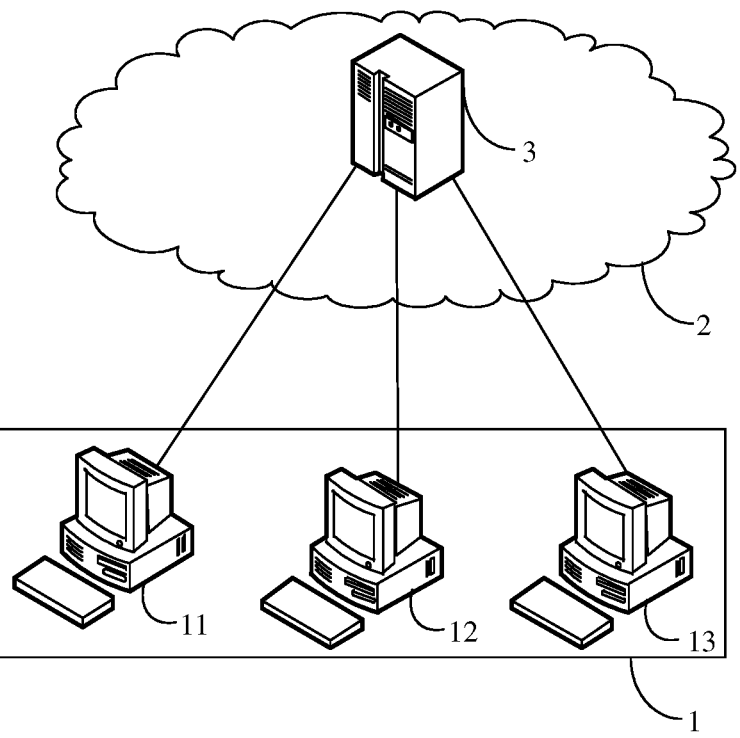
FIG. 1 is a schematic diagram of an application scenario according to the present disclosure.
FIG. 2 is a schematic diagram of a structure of a cloud server using a virtual machine structure.

FIG. 1 is a schematic diagram of an application scenario according to the present disclosure. The present disclosure is applied to the field of hybrid deployment of data centers. For example, in the scenario shown in FIG. 1, a cloud computing service provider may deploy a plurality of cloud servers 3 in an Internet 2, and the cloud server 3 provides a computing service. When needing a specific computing resource, a terminal device 1 used by a user may directly use, or obtain, by applying to the provider or paying a specific fee to the provider, a cloud computing service provided by the cloud server 3. For example, when the terminal device 1 used by the user performs a computation task with a relatively large computation amount such as gene sequencing, it takes several days to perform the computation task only relying on a computing capability provided by a CPU of the terminal device 1, which results in relatively low efficiency. In this case, the user may use the computing resource (for example, a CPU) of the cloud server 3 to perform the computation task of gene sequencing, so that the terminal device 1 can obtain a computation result of gene sequencing in a few minutes or a shorter time. Therefore, higher computation efficiency is achieved for the user. In addition, using the server 3 deployed in the Internet 2 for computation can further enable the user to use more computing resources without specially installing or upgrading the terminal device 1 used by the user, and further reduce economic costs of the user in computation. The computing resource used by the user is provided by the cloud server 3 deployed by the provider on a network side, so that this scenario in which a network resource is used for computation may also be referred to as "cloud computing".

The provider of the cloud server 3 may also deploy a plurality of virtual machines on one cloud server 3 according to a virtual machine technology to provide computing resources for different users respectively, to save resources and reduce costs. The virtual machine technology means a complete computer system that has a complete hardware system function, is simulated by using software, and executed in a respective independent environment. For example, FIG. 2 is a schematic diagram of a structure of a cloud server using a virtual machine structure. The cloud server 3 in the scenario shown in FIG. 1 is used as an example. The provider installs an operating system (the operating system may also be referred to as a host operating system (host OS), for example, Linux) based on a system resource (for example, a CPU, a memory, or a hard disk) of the cloud server 3. Different virtual machines may be executed in the operating system. When the cloud server 3 provides computing services for three terminal devices 11 to 13 shown in FIG. 1, a computing resource requested by the terminal device 11 may occupy 30% of a computing capability of the CPU in the system resource of the cloud server 3, a computing resource requested by the terminal device 12 may occupy 50% of the computing capability of the CPU in the system resource of the cloud server 3, and a computing resource requested by the terminal device 13 may occupy 20% of the computing capability of the CPU in the system resource of the cloud server 3. The provider divides the system resource of the cloud server 3 into three parts based on a proportion of computation amounts required by the three terminal devices, and three virtual machines each are executed in the three parts of system resources, denoted as virtual machines 1 to 3. Finally, the terminal device 11 may perform computation by using the virtual machine 1 provided by the cloud server 3, the terminal device 12 may perform computation by using the virtual machine 2 provided by the cloud server 3, and the terminal device 13 may perform computation by using the virtual machine 3 provided by the cloud server 3. In the cloud server 3, each user may perform an operation on a corresponding virtual machine like using a physical machine, and each virtual machine is executed by using a corresponding part of system resource without affecting each other.

However, in actual use, when using, with the terminal device 1, the virtual machine provided by the cloud server 3, the user usually applies for the computing resource based on a maximum peak of a required computation amount, without considering utilization of the resource.

As a result, in the cloud server 3 shown in FIG. 2, most of system resources allocated to the virtual machine are not used, and are often idle. Some research data in the industry indicates that utilization of the CPU in the system resource is less than 20%, but costs of the CPU occupy more than 40% of board hardware costs of the cloud server 3. Therefore, the provider of the cloud server 3 may provide a service for another user by using a resource that has been allocated to a user when the resource is idle, to improve utilization of the system resource of the cloud server 3 and reduce a quantity of cloud servers 3 deployed in the Internet 2. For example, in the cloud server shown in FIG. 2, when the 50% of system resources that the virtual machine 2 applies for are idle, the system resources may be allocated to a virtual machine 4 for use. For users using the virtual machine 2 and the virtual machine 4, they apply to the provider for 50% of system resources of the cloud server 3 respectively. For a provider side, it may be understood that the same system resources are used to meet the system resources that the virtual machine 2 and the virtual machine 4 apply for. Therefore, the utilization of the system resource of the cloud server 3 is improved in a resource sharing manner.

Figure 3:
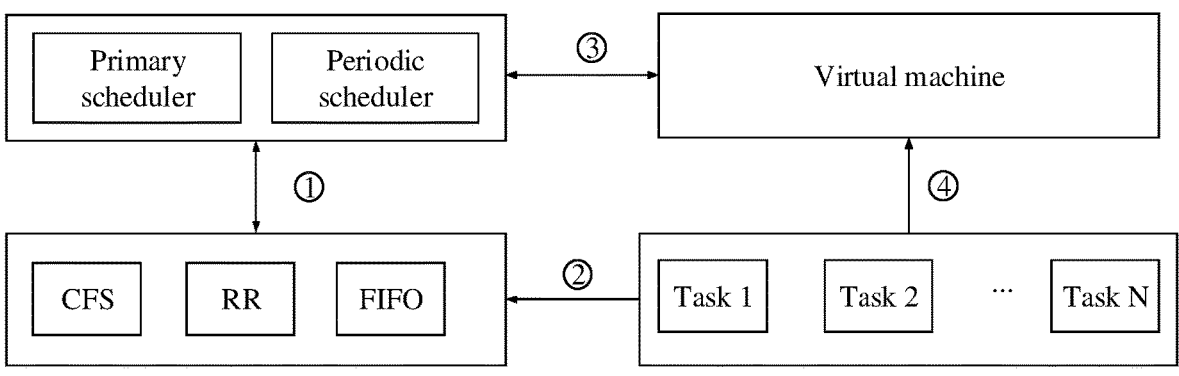
FIG. 3 is a schematic diagram of modules for scheduling a virtual machine by a cloud server.

In addition, the cloud server may further schedule tasks executed in each virtual machine, thereby implementing more proper use of virtual machine resources. For example, FIG. 3 is a schematic module diagram of scheduling a virtual machine by a cloud server. FIG. 3 shows a scheduler deployed in the cloud server. The cloud server may include a primary scheduler and a periodic scheduler. The primary scheduler is configured to directly schedule a task. The periodic scheduler is executed at a fixed frequency, and is configured to periodically schedule the task. The primary scheduler and the periodic scheduler may be combined to form a core scheduler of the cloud server, which may also be referred to as a generic scheduler. In a scenario shown in FIG. 3, an example in which the core scheduler of the cloud server schedules any virtual machine deployed in the cloud server is used. It is assumed that to-be-executed tasks in a virtual machine being scheduled by the core scheduler include a task 1 to a task N. In this case, the core scheduler first invokes a scheduler class such as a completely fair scheduler (CFS for short), an RRS (round-robin), or a first in first out (FIFO for short) in step 1. Each scheduler class may schedule a task according to a different scheduling rule. After the scheduler class obtains, in step 2, the N tasks to be executed by the virtual machine, and determines, according to a corresponding scheduling rule, to schedule the virtual machine to execute a target task, the core scheduler indicates, in a context switching manner in step 3, the target task to be executed in step 4 to the virtual machine, so as to implement scheduling of an execution sequence of the tasks executed by the virtual machine.

More specifically, an existing scheduler class may be classified into at least two different types: the completely fair scheduler (CFS) and a real-time scheduler (RR, FIFO, deadline, or the like), which are described below separately.

Figure 4:
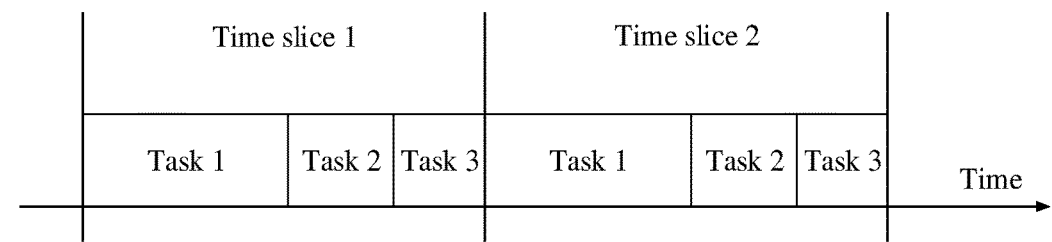
FIG. 4 is a schematic diagram of a working principle of a completely fair scheduler.

FIG. 4 is a schematic diagram of a working principle of the completely fair scheduler. When the core scheduler invokes a CFS class to schedule task 1, task 2, and task 3 to be executed by a virtual machine, the CFS class first divides execution time of the virtual machine into different continuous time slices according to a time axis, for example, time slice 1, time slice 2, . . . , in FIG. 4, and then allocates execution time to the three tasks based on weights of the tasks in each time slice. In this way, each task is executed in a time period formed by the continuous time slices, and scheduling fairness is ensured. For example, the CFS class may calculate, by using a formula "a length of a time slice×a weight of a task/a sum of weights of all tasks in a scheduling queue in which the task is located", the time allocated to each task in the time slice.

It can be seen from FIG. 4 that, when scheduling a plurality of tasks executed by the virtual machine, the completely fair scheduler class ensures that each task can be executed according to a fairness principle. However, it can be only ensured that execution time of a task with a higher weight is more than that of a task with a lower weight. When different scheduled tasks are of different priorities (a higher priority corresponds to a higher weight, and a lower priority corresponds to a lower weight), a high-priority task cannot be preferentially scheduled and executed, and the high-priority task also cannot preempt execution time of a low-priority task that is being executed.

Figure 5:
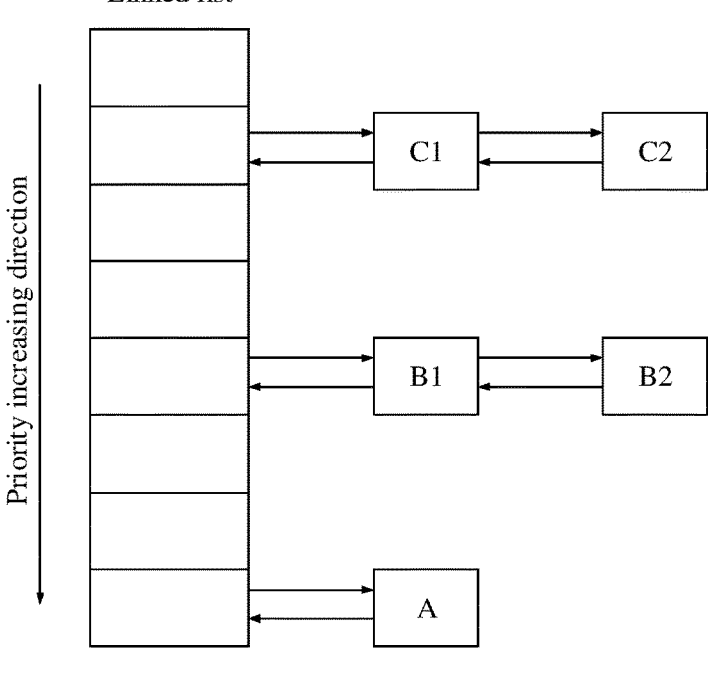
FIG. 5 is a schematic diagram of a working principle of a real-time scheduler.

FIG. 5 is a schematic diagram of a working principle of the real-time scheduler. When the core scheduler invokes a real-time scheduler class to schedule a task to be executed by a virtual machine, all tasks may be added to a linked list based on a priority sequence, for example, a linked list arranged in upper and lower directions shown in FIG. 5. A priority in the lower direction is higher, and a priority in the upper direction is lower. In this case, if the tasks to be executed by the virtual machine include a high-priority task A, medium-priority tasks B1 and B2, and low-priority tasks C1 and C2, when scheduling the foregoing tasks, a FIFO scheduler class first obtains a computing resource such as a CPU of the virtual machine by using a task that first enters an executing state, and keeps occupying the resource until the task enters a sleep state. For example, the task A is always executed after entering a queue, and there is no execution time for the tasks B1, B2, C1, and C2. The problem that there is no execution time for a low-priority task is also referred to as a "starvation problem". When scheduling the foregoing tasks, an RR scheduler class may schedule tasks with a same priority to share a resource of the virtual machine for execution in turn. For example, the RR scheduler may schedule the virtual machine to execute the medium-priority tasks B1 and B2 in a scheduler of the virtual machine in turn. In this way, fair execution of tasks with a same priority is ensured. However, the starvation problem of a lower-priority task may also be brought.

It can be seen from FIG. 5 that, the real-time scheduler class preferentially schedules a higher-priority task for execution based on priorities, so as to ensure a requirement for the priority of the task. However, when a high-priority task is scheduled, the starvation problem of a low-priority task may be brought, and a requirement of fair execution of the low-priority task cannot be met.

To sum up, in the existing scheduler class, the completely fair scheduler can only ensure fairness, but cannot perform differentiated scheduling on tasks of different priorities; and the real-time scheduler only schedules tasks of different priorities, but cannot perform fair scheduling, resulting in the starvation problem of a low-priority task. Therefore, in the application scenario of mixed deployment of the virtual machines shown in FIG. 2, in which different virtual machines share a system resource, the existing scheduler class cannot be simply used to ensure preferential scheduling of a high-priority task and fair scheduling of a low-priority task. Therefore, how to design a scheduler capable of scheduling tasks of different priorities executed on virtual machines deployed in a mixed manner and meeting scheduling fairness is a technical problem urgent to be resolved in this field.

Therefore, the present disclosure provides a task scheduling method and apparatus, to enable a scheduler to ensure both preferential scheduling of a high-priority task for execution by a virtual machine and fair scheduling of tasks with a same priority by the virtual machine when scheduling a task to be executed by the virtual machine. Specific embodiments are used below to describe in detail the technical solutions of the present disclosure. The following several specific embodiments may be combined with each other, and a same or similar concept or process may not be described repeatedly in some embodiments.

Figure 6:
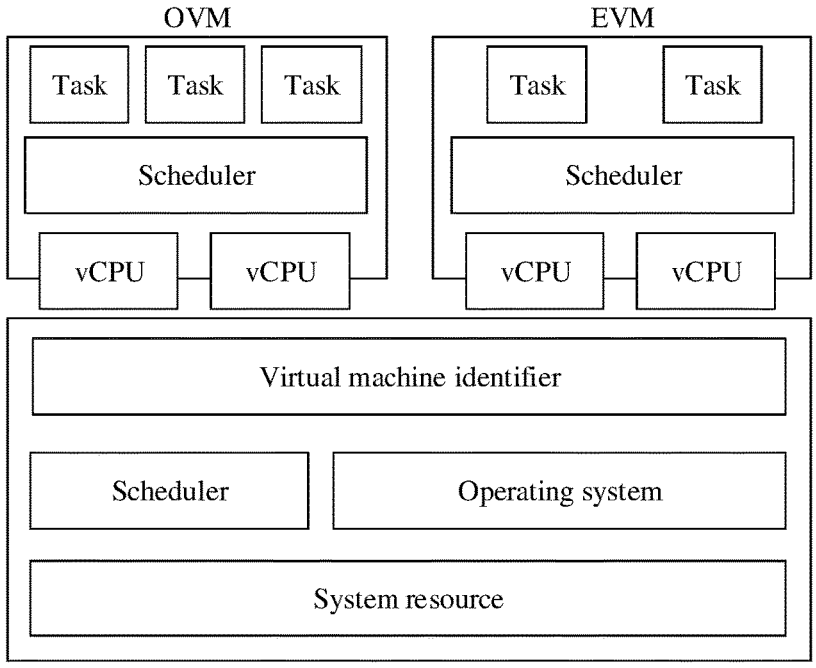
FIG. 6 is a schematic diagram of a structure of a cloud server to which a task scheduling method is applied according to the present disclosure.

FIG. 6 is a schematic diagram of a structure of a cloud server to which a task scheduling method is applied according to the present disclosure. The method provided in the present disclosure may be performed by a scheduler in a cloud server shown in FIG. 6. Specifically, in the cloud server shown in FIG. 6, different types of virtual machines may be deployed. The types of the virtual machines include at least an on-demand virtual machine (OVM for short) and an elastic virtual machine (EVM for short). The OVM may also be referred to as a non-overcommitted virtual machine. The computing capability of a vCPU of the OVM is basically consistent with the computing capability of a CPU of a physical machine, and is suitable for processing tasks that are sensitive to both computing and latency. The EVM may also be referred to as an overcommitted virtual machine or a shared virtual machine, is a computing instance that may be preempted, and is suitable for processing tasks in a batch processing scenario and a service scenario with a fault tolerance mechanism. In the cloud server shown in FIG. 6, an operating system may be installed on a system resource of a host of the cloud server, and a scheduler executed in the operating system may be configured to schedule a task executed by each virtual machine. In addition, a virtual machine identification module is further set in the operating system of the cloud server to schedule tasks of different priorities, and is configured to mark a priority of a task to be executed by each virtual machine. In addition, a scheduler may be further set in each virtual machine, and is configured to schedule the task to be executed by each virtual machine. An example in which the cloud server shown in FIG. 6 includes one OVM virtual machine and one EVM virtual machine is used to describe deployment of different types of virtual machines in the cloud server. It may be understood that a plurality of OVMs and a plurality of EVMs may be deployed in the cloud server shown in FIG. 6, which are not shown in the figure. Each virtual machine, regardless of whether the type of the virtual machine is an OVM or an EVM, is equivalent to a computer that runs independently. In this case, a system resource, for example, a CPU, of the cloud server used by the virtual machine can be executed independently. A partial CPU resource in each virtual machine may also be referred to as a vCPU.

Figure 7:
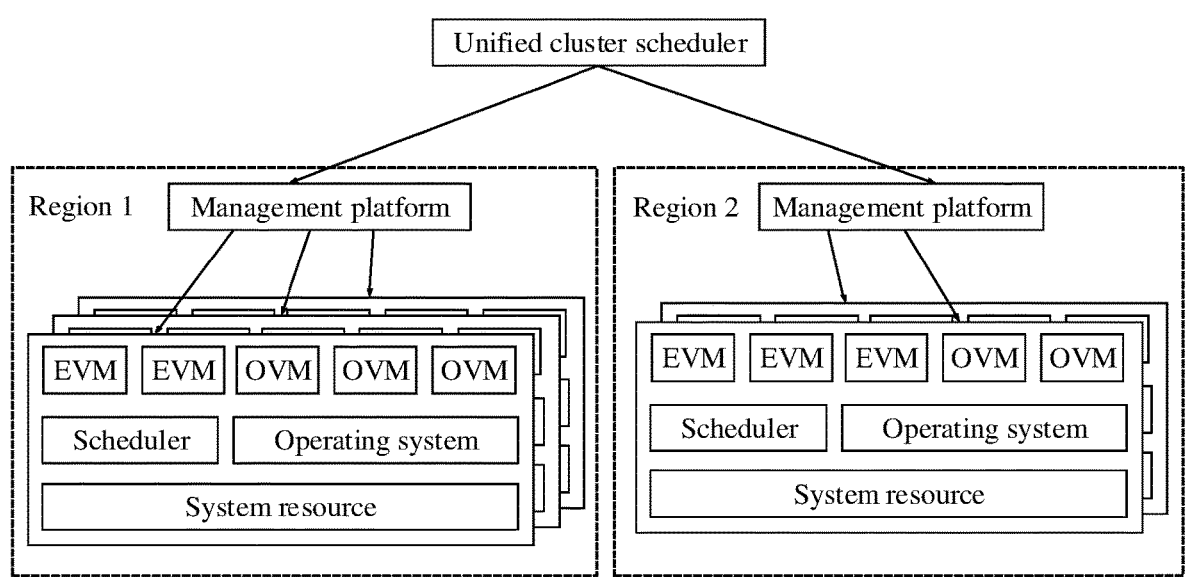
FIG. 7 is a schematic deployment diagram of a cloud server cluster according to the present disclosure.

After the cloud server is deployed in a deployment manner shown in FIG. 6, because an OVM virtual machine and an EVM virtual machine may be deployed in each cloud server at the same time, a provider of the cloud server may not need to deploy different types of virtual machines in a cluster by using different cloud servers, but may implement a comprehensive deployment manner shown in FIG. 7. FIG. 7 is a schematic deployment diagram of a cloud server cluster according to the present disclosure. The provider manages cloud server clusters in different regions by using a unified cluster scheduling platform. Different types of virtual machines may be deployed in each of a plurality of cloud servers in each region. Therefore, the cloud server cluster is deployed more flexibly, and deployment of only one type of virtual machines in each cloud server is avoided. In addition, a dynamic resource agent may further be set on each cloud server, and is configured to collect statistics on resource usage of each cloud server, so as to feed back resource information of each cloud server to a unified cluster scheduler.

Particularly, the task scheduling method provided in the present disclosure may be performed by a scheduler in each cloud server in FIG. 6 or FIG. 7. Although different types of virtual machines are deployed in each cloud server, and each virtual machine has its own scheduler, when the scheduler set in the cloud server schedules a task executed by each virtual machine, on-demand allocation of OVMs can be implemented on a premise that fairness of a task executed by each OVM or EVM is ensured. A scheduler in each virtual machine stores and schedules a to-be-executed task queue of the virtual machine. The scheduler in the cloud server may schedule a task to be executed by the virtual machine in a manner of adjusting the to-be-executed task queue of the scheduler in the virtual machine.

The following describes in detail the task scheduling method provided in the present disclosure by using specific embodiments. The following several specific embodiments may be combined with each other, and all or some of the embodiments may be implemented by a same execution body. A same or similar concept or process may not be described in detail in some embodiments. The task scheduling method provided in the present disclosure may be performed by the scheduler in the cloud server shown in FIG. 6 or FIG. 7, or may be performed by another apparatus in the cloud server in FIG. 6 or FIG. 7. In the present disclosure, an example in which the scheduler in the cloud server shown in FIG. 6 is used as the execution body is used only to describe a process of the task scheduling method, instead of limiting the structure of the cloud server.

Embodiment 1

According to a task scheduling method provided in Embodiment 1 of the present disclosure, when a scheduler schedules a task in a virtual machine, a requirement for a priority of the task is met, and fair scheduling of tasks is implemented, that is, scheduling of tasks of different priorities is implemented based on a CFS. The method may be understood as an enhanced CFS-based scheduling method.

Figure 8:
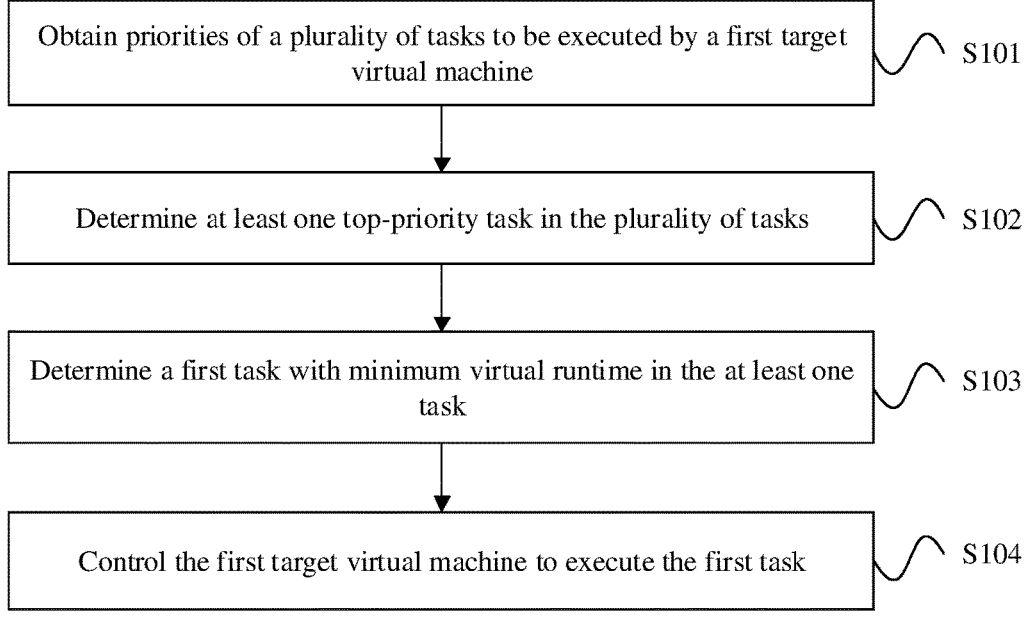
FIG. 8 is a schematic flowchart of an embodiment of a task scheduling method according to the present disclosure.

FIG. 8 is a schematic flowchart of an embodiment of a task scheduling method according to the present disclosure. The task scheduling method shown in FIG. 8 may be performed by the scheduler in the operating system of the host in the cloud server shown in FIG. 6, and is applied to a scenario in which the scheduler schedules a task to be executed by a first target virtual machine in the cloud server. The first target virtual machine may be any OVM or any EVM deployed in the cloud server. A scheduler in the first target virtual machine is denoted as a first scheduler. The first scheduler stores and schedules, by using a task queue, the task to be executed by the first target virtual machine. The scheduler serving as an execution body may be connected to the first scheduler, obtain the task queue stored in the first scheduler, and adjust a to-be-executed task in the first scheduler to adjust the task to be executed by the first target virtual machine. Specifically, the task scheduling method provided in this embodiment includes the following steps.

S101: The scheduler obtains priorities of all tasks to be executed by the first target virtual machine.

Specifically, the scheduler first obtains, from the first scheduler of the first target virtual machine in S101, all the tasks currently to be executed by the first target virtual machine and the priorities of all the tasks. The priority may be divided in advance, or may be divided by the scheduler based on a type of the task. For example, a service that is insensitive to a computing delay, such as gene sequencing and a batch service, corresponds to a relatively low priority; and a service that is sensitive to a computing delay, such as real-time rendering of online video content, corresponds to a relatively high priority. In the cloud server shown in FIG. 6, priorities of all tasks may also be uniformly managed by the virtual machine identification module set in the host.

Figure 9:
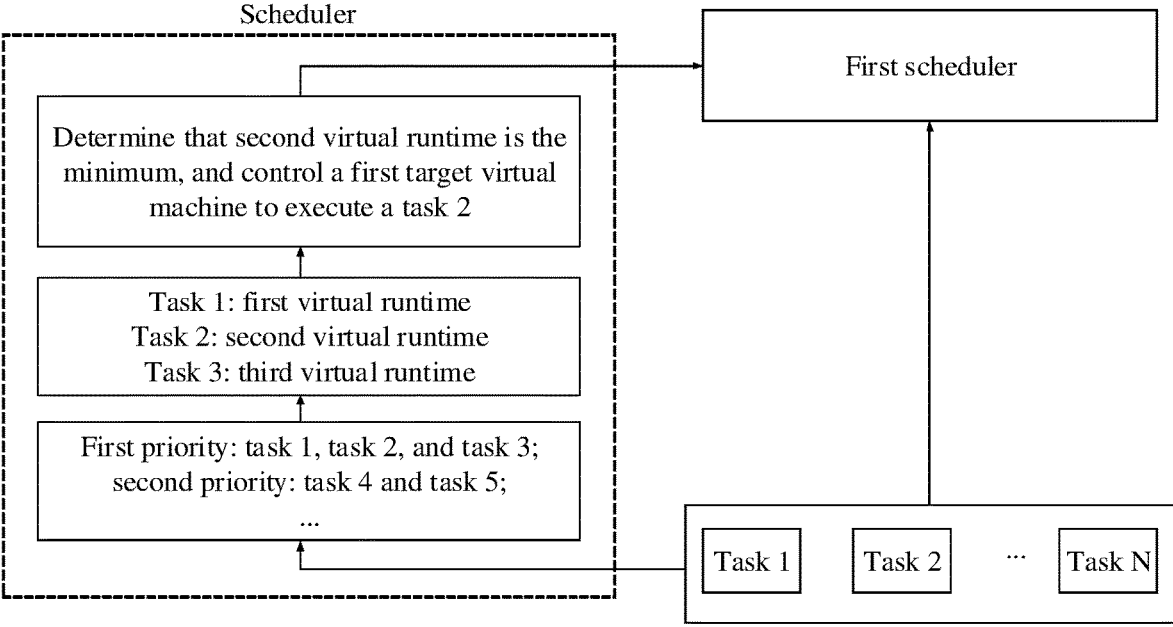
FIG. 9 is a schematic diagram of a scheduling process in a task scheduling method according to the present disclosure.

The following provides description with reference to an example in FIG. 9. FIG. 9 is a schematic diagram of a scheduling process in a task scheduling method according to the present disclosure. It is assumed that when the first scheduler schedules the first target virtual machine, the task queue in the first scheduler stores N tasks currently to be executed by the first target virtual machine, respectively a task 1, a task 2, . . . , and a task N, where N>1. In this case, in S101, the scheduler serving as the execution body in the cloud server may first obtain the N tasks and a priority corresponding to each task from the first scheduler of the first target virtual machine, to determine the to-be-executed tasks of the first target virtual machine. For example, in the N tasks, tasks of a first priority include the task 1, the task 2, and a task 3, and tasks of a second priority include a task 4, a task 5, and the like. In this embodiment, a quantity of priorities of the to-be-executed tasks of the first target virtual machine is not limited, and an example in which priorities are arranged in descending order of the first priority, the second priority, and the like is used for description.

S102: The scheduler determines at least one top-priority task in all the tasks.

Then, the scheduler determines the at least one top-priority task from all the N tasks obtained in S101. For example, in the example shown in FIG. 9, the scheduler determines that tasks corresponding to the highest first priority include the task 1, the task 2, and the task 3.

Optionally, in a first possible implementation of S102, the scheduler may determine the priorities of all the tasks in the to-be-executed task queue in a manner of traversing the priorities of all the tasks in the to-be-executed task queue stored in the first scheduler, and determine the at least one top-priority task from all the tasks. Optionally, the queue may be a linked list, an array, a tree structure, or the like. When the to-be-executed task queue is a red-black tree in the tree structure, the scheduler may traverse the entire red-black tree to obtain the at least one top-priority task in the red-black tree.

Alternatively, in a second possible implementation of S102, the scheduler may store priority record information in dedicated storage space, and record, by using the priority record information, the priority of each task added to the to-be-executed task queue of the first scheduler.

For example, the scheduler may record correspondences between different tasks and priorities by using an array, where a form of the correspondences may be "task 1—first priority, task 2—first priority . . . ". In this case, in S102, the scheduler may determine the at least one top-priority task in the to-be-executed task queue of the first scheduler based on the priority record information recorded in the storage space.

Alternatively, in a third possible implementation of S102, a plurality of to-be-executed task queues may be set in the first scheduler, and each to-be-executed task queue corresponds to one priority. The queue may also be a linked list, an array, a tree structure, or the like. When the to-be-executed task queue is a red-black tree in the tree structure, the scheduler may use different red-black trees to represent to-be-executed task queues corresponding to different priorities. For example, in the example shown in FIG. 9, the task 1, the task 2, and the task 3 that correspond to the first priority may be recorded by using a first red-black tree, and the task 4 and the task 5 that correspond to the second priority may be recorded by using a second red-black tree. In this case, the scheduler may directly obtain the at least one top-priority task from the first red-black tree corresponding to the highest first priority in S102. Therefore, efficiency of obtaining the at least one top-priority task is improved in S102.

S103: The scheduler determines a task with a minimum virtual runtime, denoted as a first task, in the at least one task.

Then, in S103, the scheduler further determines the first task with the minimum virtual runtime in the at least one task obtained in S102. The virtual runtime may also be referred to as "vruntime". Virtual runtime of each task=actual execution time of the task×1024/a sum of weights of all the to-be-executed tasks. For example, weights of the to-be-executed task 1, task 2, and task 3 in the first scheduler are 1, 2, and 3 respectively, and the sum of the weights of all the to-be-executed tasks is 1+2+3=6. The scheduler measures, by using the virtual runtime of each task, which task is most worth scheduling. In the CFS, all the to-be-executed tasks may be represented by a red-black tree in which a virtual runtime is a key value, and a process with a shorter virtual runtime is closer to a leftmost end of the entire red-black tree. Each time the first scheduler controls the first target virtual machine to execute a task located at the leftmost end of the red-black tree, a virtual runtime of the process is minimum. Therefore, in this embodiment, after determining the at least one top-priority task in S102, the scheduler may determine the first task with the minimum virtual runtime from the at least one top-priority task. For example, in the example shown in FIG. 9, after determining the task 1, the task 2, and the task 3 that correspond to the first priority, the scheduler determines, from a first virtual runtime of the task 1, a second virtual runtime of the task 2, and third virtual runtime of the task 3, that the second virtual runtime corresponding to the task 2 is minimum, and then determines the task 2 as the first task.

S104: The scheduler controls the first scheduler to schedule the first target virtual machine to execute the first task.

Finally, in S104, the scheduler controls the first scheduler, so that the first scheduler adjusts the task queue in the first scheduler. Therefore, the first scheduler schedules the first target virtual machine to execute the first task determined in S103. Optionally, the scheduler may adjust a sequence of the tasks in the to-be-executed task queue in the first scheduler in a context switch manner, so as to control the first scheduler of the first target virtual machine to first obtain the first task from the to-be-executed task queue and execute the first task by a processor (vCPU) of the first target virtual machine.

It may be understood that an example in which the to-be-executed task queue in the first scheduler includes tasks of a plurality of priorities is used in the embodiment shown in FIG. 8 and FIG. 9. If the to-be-executed task queue in the first scheduler includes a task of only one priority, the scheduler may directly perform S103 after S101, that is, determine the first task with the minimum virtual runtime from all the obtained tasks, and control the first target virtual machine to execute the first task in S104.

In addition, in this embodiment, after the first task is executed, the scheduler repeatedly performs S101 in the task scheduling method shown in FIG. 8, and continues to schedule, by using the first scheduler, the first target virtual machine to execute a task with minimum virtual execution time in the at least one top-priority task in the to-be-executed task queue of the first target virtual machine. Therefore, it is ensured that the first target virtual machine currently executes a top-priority task, and tasks with the same priority can be fairly scheduled. Therefore, in the example shown in FIG. 9, according to this sequence, the first target virtual machine sequentially executes the tasks of the first priority, the second priority, . . . , and the like. When same tasks corresponding to each priority are scheduled, selecting a virtual runtime is equivalent to using a CFS-based completely fair scheduling policy, thereby implementing a CFS-based scheduling policy.

To sum up, in the task scheduling method provided in this embodiment, when scheduling the first target virtual machine to execute a task, the scheduler first determines the at least one top-priority task in the to-be-executed task queue of the first target virtual machine, so that preferential execution of the top-priority task is ensured. Then, for the at least one top-priority task, the first task with the minimum virtual runtime is selected for execution, so that fair scheduling of tasks with the same priority is ensured. Therefore, compared with the completely fair scheduler in a conventional technology shown in FIG. 4, the task scheduling method provided in this embodiment can schedule a high-priority task to be preferentially executed. Compared with the real-time scheduler shown in FIG. 5, the method can further ensure fair scheduling of tasks with a same priority. Therefore, when scheduling the tasks on the first target virtual machine, the scheduler can ensure both preferential scheduling of a high-priority task and fair scheduling of tasks with a same priority. The method can be applied to the scenario of hybrid deployment and scheduling of virtual machines shown in FIG. 6 or FIG. 7.

Embodiment 2

According to a task scheduling method provided in Embodiment 2 of the present disclosure, when a scheduler schedules a task, if a priority of a task in a to-be-executed task queue is adjusted in a first scheduler of a first target virtual machine, a task that the first scheduler currently schedules the first target virtual machine to execute may be preempted, that is, the scheduler dynamically schedules the task of the first target virtual machine. Therefore, scheduling requirements of the scheduler for a plurality of different types of tasks are met.

FIG. 10 is a schematic flowchart of an embodiment of a task scheduling method according to the present disclosure. The task scheduling method shown in FIG. 10 may be performed by the scheduler in the operating system of the host in the cloud server shown in FIG. 6, and is applied to a scenario in which the scheduler schedules a task to be executed by the first target virtual machine in the cloud server. The first target virtual machine may be any OVM or any EVM deployed in the cloud server. A scheduler in the first target virtual machine is denoted as the first scheduler. The first scheduler stores and schedules, by using the task queue, the task to be executed by the first target virtual machine. The method includes the following steps.

S201: When determining that a second task in the to-be-executed task queue of the first target virtual machine is adjusted from a second priority to a first priority, the scheduler obtains a minimum virtual runtime in at least one task that is to be executed by the first target virtual machine and has a same priority as the first priority.

Specifically, when the first scheduler schedules the first target virtual machine to execute a task (the task that is being executed by the first virtual machine is denoted as a third task), if the second task in the to-be-executed task queue of the first target virtual machine in the first scheduler is adjusted from the second priority to the first priority, or the second task is added to the to-be-executed task queue in the first scheduler, the scheduler determines, in S201, that a priority of the second task to be executed by the first target virtual machine changes, and determine the minimum virtual runtime in the at least one task of the same priority as the first priority.

S202: The scheduler adjusts a first virtual runtime corresponding to the second task to a second virtual runtime based on the minimum virtual runtime determined in S201.

The following provides description with reference to an example in FIG. 11. FIG. 11 is a schematic diagram of a scheduling process in a task scheduling method according to the present disclosure. It is assumed that N tasks that the first scheduler currently schedules the first target virtual machine to execute are a task 1, a task 2, . . . , and a task N respectively, where N>1. In this case, in S201, the scheduler serving as an execution body first obtains a task whose priority is adjusted from the second priority to the first priority, denoted as the second task, or may obtain a newly added $(N+1)^{th}$ task, denoted as the second task, and further determine the first priority corresponding to the second task and the first virtual runtime corresponding to the second task. Alternatively, the second task may be a task that is added to the to-be-executed task queue in the first scheduler after the second task is switched from a sleep state to an awake state, and in this case, the scheduler may directly obtain, from the to-be-executed task queue, the second virtual runtime of the newly added second task.

Then, the scheduler adjusts the first virtual runtime of the second task obtained in S201 to the second virtual runtime. An objective of adjusting the virtual runtime of the second task is to ensure that there is execution time for the second task. Therefore, adjustment of the virtual runtime of the second task should be related to the third task that is currently executed or a task with a same priority as the second task.

Specifically, for a specific implementation of this embodiment, refer to S2021 to S2023 shown in FIG. 12. FIG. 12 is a schematic flowchart of an embodiment of a task scheduling method according to the present disclosure. Based on the method shown in FIG. 11, in the method shown in FIG. 12, after obtaining the second task, the scheduler determines, in S2021, whether there is another task that is of the same priority as the second task and that corresponds to the first priority in the to-be-executed task queue in the first scheduler. If there is no task of the first priority in the to-be-executed task queue in the first scheduler, S2022 is performed; or if there is another task of the first priority in the to-be-executed task queue in the first scheduler, S2023 is performed.

In S2022, if none of the N tasks in the to-be-executed task queue is a task of the first priority, the scheduler adjusts the first virtual runtime of the second task with reference to a virtual runtime of the third task that the first scheduler is scheduling the first target virtual machine to execute. Specifically, an adjustment principle may make the second virtual runtime after the first virtual runtime is adjusted slightly greater than the virtual runtime of the third task. For example, when the first virtual runtime is less than the virtual runtime of the third task, the scheduler adds a first variable to the first virtual runtime to obtain the second virtual runtime, so that the second virtual runtime is greater than the virtual runtime of the third task. The variable may be adjusted in real time based on an actual situation.

In S2023, if there is another task of the first priority in the to-be-executed task queue in the first scheduler, for example, in a scenario shown in FIG. 11, when it is determined that the task 1, the task 2, and the task 3 that the first scheduler schedules the target virtual machine to execute is of the same priority as the second task, and all correspond to the first priority, the scheduler specifically adjusts the first virtual runtime based on a minimum virtual runtime in determined virtual runtimes of the task 1 to the task 3. Specifically, an adjustment principle may make the second virtual runtime after the first virtual runtime is adjusted slightly greater than the virtual runtime of the third task. For example, when the first virtual runtime is less than the virtual runtime of the third task, the scheduler adds a first variable to the first virtual runtime to obtain the second virtual runtime, so that the second virtual runtime is greater than the minimum virtual runtime in the virtual runtime of the task 1 to the task 3. The first variable may be adjusted based on an actual situation.

S203: When the first priority is higher than the priority of the third task that is being executed by the first target virtual machine, the scheduler controls the first target virtual machine to execute the second task. In this case, the second task corresponds to the second virtual runtime.

Finally, after adjusting, in S202, the virtual runtime of the second task newly added to the to-be-executed task queue, the scheduler may control the first scheduler, so that the first scheduler schedules the first target virtual machine to execute the second task. Particularly, in this step, the scheduler further compares the priority of the task that is being executed by the first scheduler with the priority of the second task, so that the second task preempts the third task when the first priority of the second task is higher than the priority of the third task that is being executed.

Alternatively, in the embodiment shown in FIG. 10, in another possible implementation of S201, the second task may be originally stored in the to-be-executed task queue in the first scheduler. In this case, after obtaining the second task in S201, the scheduler further determines, based on indication information sent by a user, to adjust the priority corresponding to the second task from the second priority to the first priority. Then, in S202, the scheduler specifically adjusts the first virtual runtime to the second virtual runtime based on the minimum virtual runtime in the virtual runtime of the at least one task corresponding to the second priority in the to-be-executed task queue in the first scheduler. It is assumed that, before the priority of the second task is adjusted, a first virtual runtime corresponding to the at least one task corresponding to the second priority is Ta, and a minimum value in the virtual runtime of the at least one task corresponding to the second priority is denoted as minA; and after the priority of the second task is adjusted, a minimum value in virtual runtime(s) of at least one task corresponding to the first priority is denoted as minB. In this case, the scheduler adjusts the first virtual runtime to the second virtual runtime by using a formula: the second virtual runtime=(Ta+minB)−minA. Therefore, the second virtual runtime after adjustment is slightly greater than the minimum value in the virtual runtime of the at least one task with the first priority in the task corresponding to the first priority. It should be noted that the foregoing formula is merely an example for description, and in actual adjustment, the scheduler is not limited to performing adjustment in this manner.

To sum up, in the task scheduling method provided in this embodiment, when the first target virtual machine executes the third task, if obtaining the second task corresponding to the first priority, the scheduler adjusts the first virtual runtime of the second task to the second virtual runtime based on the minimum virtual runtime in the virtual runtime of the at least one task corresponding to the first priority in the to-be-executed task queue of the first target virtual machine or based on the virtual runtime of the third task. Finally, when the first priority of the second task is higher than the priority of the third task, the first target virtual machine is controlled to execute the second task, thereby implementing preemptive execution of the second task newly added to the to-be-executed task queue of the first target virtual machine. Therefore, according to the task scheduling method provided in this embodiment, a disadvantage that the completely fair scheduler shown in FIG. 4 and the real-time scheduler shown in FIG. 5 cannot provide preemption is overcome, and when the scheduler runs tasks of a plurality of priorities on the first target virtual machine, a high-priority task can preempt a low-priority task for execution. The method can be applied to the scenario of hybrid deployment and scheduling of virtual machines shown in FIG. 6 or FIG. 7.

Embodiment 3

A task scheduling method provided in Embodiment 3 of the present disclosure may be applied to a case in which a low-priority task in a to-be-executed task queue stored in a first scheduler of a first target virtual machine is always not executed when a scheduler schedules a task in the first target virtual machine. In this case, the low-priority task may be actively migrated to another virtual machine (denoted as a second target virtual machine) for execution. Therefore, a starvation problem of a low-priority task caused by preferential scheduling of a high-priority task during execution of tasks of a plurality of priorities by the first target virtual machine is prevented.

FIG. 13 is a schematic flowchart of an embodiment of a task scheduling method according to the present disclosure. The task scheduling method shown in FIG. 13 may be performed by the scheduler in the operating system of the host in the cloud server shown in FIG. 6, and is applied to a scenario in which the scheduler schedules a task to be executed by the first target virtual machine in the cloud server. The first target virtual machine may be any OVM or any EVM deployed in the cloud server. A scheduler in the first target virtual machine is denoted as the first scheduler. The first scheduler stores and schedules, by using the task queue, the task to be executed by the first target virtual machine. The method includes the following steps.

S301: The scheduler obtains time record information of the first scheduler when the first target virtual machine executes a fourth task.

Specifically, when the first target virtual machine executes a task (the task that is being executed by the first target virtual machine is denoted as the fourth task), the scheduler further records a task in the task queue in the first scheduler of the first target virtual machine by using the time record information. S301 may be performed by the scheduler when a clock is interrupted, or may be performed when the scheduler switches scheduling, or may be performed by the scheduler in a manner of setting a timer. The fourth task corresponds to a third priority. In addition, the to-be-executed task queue stored in the first scheduler of the first target virtual machine further includes at least a fifth task. A priority corresponding to the fifth task is lower than the third priority.

Optionally, the time record information may be stored in storage space in the scheduler, or stored in storage space in the first target virtual machine. In a possible implementation, the time record information is used to record execution time of the fourth task. Alternatively, in another possible implementation, the time record information is used to record waiting time of the fifth task in the to-be-executed task queue.

The following provides description with reference to an example in FIG. 14. FIG. 14 is a schematic diagram of a scheduling process in a task scheduling method according to the present disclosure. It is assumed that N tasks currently to be executed by the first scheduler of the first target virtual machine are a task 1, a task 2, . . . , and a task N respectively, where N>1. In addition, the first target virtual machine is executing the fourth task in the N tasks in the to-be-executed task queue. In this case, the scheduler may obtain the time record information at a current moment in S301.

S302: When the time record information meets a preset condition, the scheduler controls the first scheduler of the first target virtual machine to send the fifth task stored in the first scheduler to a second scheduler of the second target virtual machine, so that the second scheduler controls the second target virtual machine to execute the fifth task.

Specifically, after obtaining the time record information in S301, the scheduler determines, based on the time record information, to schedule the fifth task to the second target virtual machine for execution. For example, when the time record information is used to record the execution time for which the first target virtual machine has executed the fourth task, the preset condition may be that the execution time of the fourth task is less than a first threshold (1 s). For example, when the fourth task has been executed for 1 second, a starvation problem of the fifth task may be caused by the fact that the priority of the fourth task is relatively high and the fifth task with the relatively low priority is always not executed. Therefore, after determining that the execution time of the fourth task is greater than the first threshold and the preset condition is met, the scheduler may schedule the second target virtual machine to execute the fifth task.

For another example, when the time record information is used to record the waiting time of the fifth task in the to-be-executed task queue of the first target virtual machine, the preset condition may be that the waiting time of the fifth task is greater than a second threshold. Likewise, after determining that the waiting time of the fifth task is greater than the second threshold and the preset condition is met, the scheduler may schedule the second target virtual machine to execute the fifth task, so as to prevent the starvation problem of the fifth task.

Further, the second target virtual machine may be any virtual machine in the cloud server. In this case, before controlling, in S302, the second target virtual machine to execute the fifth task, the scheduler may further determine the second target virtual machine in the cloud server. For example, the second target virtual machine may be a virtual machine that is currently in an idle state in the cloud server, so that when the scheduler controls the second target virtual machine to execute the fifth task, another task running on the second target virtual machine is not affected. Alternatively, the second target virtual machine may be a virtual machine whose current load is less than a third threshold in the cloud server, so that when the scheduler controls the second target virtual machine to execute the fifth task, impact on another task running on the second target virtual machine is reduced. Alternatively, the second target virtual machine may be a virtual machine specially deployed by the cloud server to execute a task of the priority corresponding to the fifth task, that is, the cloud server allocates tasks of different priorities to different virtual machines for execution, and in this case, when scheduling the fifth task in S302, the scheduler selects a virtual machine corresponding to a fourth priority of the fifth task as the second target virtual machine.

Optionally, when scheduling the fifth task, the scheduler may determine the second target virtual machine in the following order: preferentially selecting an idle-state virtual machine in the cloud server, then selecting a virtual machine with a relatively low task priority and a relatively light load in a scheduling queue of virtual machines in the cloud server, and next selecting a virtual machine with a relatively low task priority but a relatively heavy load in the scheduling queue of the virtual machines in the cloud server or a virtual machine with a relatively high priority but a relatively light load in the scheduling queue of the virtual machines in the server.

Optionally, the second target virtual machine may be a virtual machine specially deployed in the cloud server. The virtual machine is dedicated to executing, in a scenario of preventing the starvation problem shown in FIG. 14, a task scheduled by the scheduler from another virtual machine. In this case, in S302, the scheduler may directly control the second target virtual machine to execute the fifth task.

To sum up, in the task scheduling method provided in this embodiment, when the first target virtual machine executes the fourth task, the scheduler further obtains the time record information to determine whether the starvation problem occurs in the fifth task of the relatively low priority, and after the time record information meets the preset condition, controls the second target virtual machine in the cloud server to execute the fifth task. Therefore, scheduling of the fifth task between different target virtual machines is implemented, the fifth task is prevented from staying in the to-be-executed queue of the first target virtual machine because of the relatively low priority, and the starvation problem is prevented.

In the foregoing embodiments, the task scheduling method provided in embodiments of the present disclosure is described. To implement the functions in the task scheduling method provided in embodiments of the present disclosure, the scheduler serving as the execution body may include a hardware structure and/or a software module, and implement the functions in a form of the hardware structure, the software module, or both the hardware structure and the software module. Whether a function in the foregoing functions is performed by using the hardware structure, the software module, or both the hardware structure and the software module depends on particular applications and design constraints of the technical solutions.

For example, FIG. 15 is a schematic diagram of a structure of an embodiment of a task scheduling apparatus according to the present disclosure. The task scheduling apparatus shown in FIG. 15 may be configured to perform the task scheduling method shown in FIG. 8. The apparatus includes an obtaining module 1501, a priority determining module 1502, a virtual runtime determining module 1503, and a control module 1504. The obtaining module 1501 is configured to obtain priorities of a plurality of tasks to be executed by a first target virtual machine. The priority determining module 1502 is configured to determine at least one top-priority task in the plurality of tasks. The virtual runtime determining module 1503 is configured to determine a first task with minimum virtual runtime from the at least one task. The control module 1504 is configured to control the first target virtual machine to execute the first task.

Optionally, the obtaining module 1501 is specifically configured to determine, based on a to-be-executed task queue stored in a first scheduler of the first target virtual machine, the priorities of the plurality of tasks to be executed by the first target virtual machine.

Optionally, the obtaining module 1501 is specifically configured to traverse priorities of all tasks in the to-be-executed task queue stored in the first scheduler, and determine the at least one top-priority task from the to-be-executed task queue.

Optionally, the obtaining module 1501 is specifically configured to determine the at least one top-priority task in the plurality of tasks based on priority record information stored in the first scheduler. The priority record information is used to record priorities of all tasks in the to-be-executed task queue in the first scheduler.

Optionally, the obtaining module 1501 is specifically configured to determine the at least one top-priority task based on a task in a queue that is stored in the first scheduler and corresponds to a top priority. The first scheduler stores the to-be-executed tasks by using a plurality of queues. Each queue corresponds to a different priority.

FIG. 16 is a schematic diagram of a structure of an embodiment of a task scheduling apparatus according to the present disclosure. The task scheduling apparatus shown in FIG. 16 may be configured to perform the task scheduling method shown in FIG. 10. The apparatus includes an obtaining module 1601, a virtual runtime adjustment module 1602, and a control module 1603. The obtaining module 1601 is configured to, when a priority of a second task to be executed by a first target virtual machine is adjusted from a second priority to a first priority, obtain, in at least one task that is to be executed by the first target virtual machine and has a same priority as the first priority, a minimum virtual runtime corresponding to the at least one task. The virtual runtime adjustment module 1602 is configured to adjust a first virtual runtime corresponding to the second task to a second virtual runtime based on the minimum virtual runtime. The control module 1603 is configured to, when the first priority is higher than a priority of a third task that is being executed by the first target virtual machine, control the first target virtual machine to execute the second task.

Optionally, the second virtual runtime is greater than the minimum virtual runtime in virtual runtime of the at least one task corresponding to the first priority in a to-be-executed task queue stored in a first scheduler of the first target virtual machine.

Optionally, the task scheduling apparatus further includes a receiving module 1604, configured to receive indication information, and determine, based on the indication information, to adjust the priority of the second task from the second priority to the first priority.

Optionally, the virtual runtime adjustment module 1602 is specifically configured to add the minimum virtual runtime to the first virtual runtime, and then subtract the minimum virtual runtime in the virtual runtime of the at least one task corresponding to the second priority in the to-be-executed task queue, to obtain the second virtual runtime.

FIG. 17 is a schematic diagram of a structure of an embodiment of a task scheduling apparatus according to the present disclosure. The task scheduling apparatus shown in FIG. 17 may be configured to perform the task scheduling method shown in FIG. 13. The apparatus includes an obtaining module 1701 and a control module 1702. The obtaining module 1701 is configured to obtain time record information stored in a first scheduler of a first target virtual machine. The time record information is used to record execution time with a fourth task, and the fourth task corresponds to a third priority. Alternatively, the time record information is used to record waiting time of a fifth task in a to-be-executed task queue stored in the first scheduler, and a priority corresponding to the fifth task is lower than the third priority. The control module 1702 is configured to, when the time record information meets a preset condition, control the first scheduler of the first target virtual machine to send the fifth task to a second scheduler of a second target virtual machine, so that the second target virtual machine executes the fifth task.

Optionally, when the time record information is used to record the execution time of the fourth task, the preset condition includes that the execution time of the fourth task is greater than a first threshold.

Optionally, when the time record information is used to record the waiting time of the fifth task in the to-be-executed task queue in the first scheduler, the preset condition includes that the waiting time is greater than a second threshold.

Optionally, the second target virtual machine is an idle-state virtual machine in a plurality of virtual machines deployed on a host on which the first target virtual machine is located. Alternatively, the second target virtual machine is a virtual machine whose load is less than a third threshold in a plurality of virtual machines deployed on a host. Alternatively, the second target virtual machine is a scheduler, in a plurality of virtual machines deployed on a host, configured to execute a task of a fourth priority, where the fourth priority is lower than the third priority.

Optionally, the second target virtual machine is a scheduler dedicated to executing the fifth task when the time record information meets the preset condition.

It should be noted and understood that division of the modules of the foregoing apparatus is merely logic function division. During actual implementation, some or all modules may be integrated into one physical entity, or the modules may be physically separated. The modules may be all implemented in a form of software invoked by a processing element, or may be all implemented in a form of hardware. Alternatively, some modules may be implemented in a form of software invoked by a processing element, and some modules are implemented in a form of hardware. For example, a determining module may be a processing element separately disposed, or may be integrated in a chip of the foregoing apparatus for implementation. In addition, the determining module may alternatively be stored in the memory of the foregoing apparatus in a form of program code, and is invoked by a processing element of the foregoing apparatus to perform a function of the determining module. Implementations of other modules are similar to the implementation of the determining module. In addition, all or some of the modules may be integrated together, or may be implemented independently. The processing element herein may be an integrated circuit, and have a signal processing capability. In an implementation process, steps in the foregoing methods or the foregoing modules can be implemented by using a hardware integrated logical circuit in the processing element, or by using instructions in a form of software.

For example, the foregoing modules may be configured as one or more integrated circuits for implementing the foregoing method, such as one or more application-specific integrated circuits (ASIC), one or more microprocessors (DSP), or one or more field programmable gate arrays (FPGA). For another example, when one of the foregoing modules is implemented in a form of scheduling program code by a processing element, the processing element may be a general-purpose processor, such as a central processing unit (CPU) or another processor that can invoke the program code. For another example, the modules may be integrated together, and implemented in a form of a system-on-a-chip (SOC).

All or some of the foregoing embodiments may be implemented by using software, hardware, firmware, or any combination thereof. When software is used to implement the embodiments, all or a part of the embodiments may be implemented in the form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Figure 18:
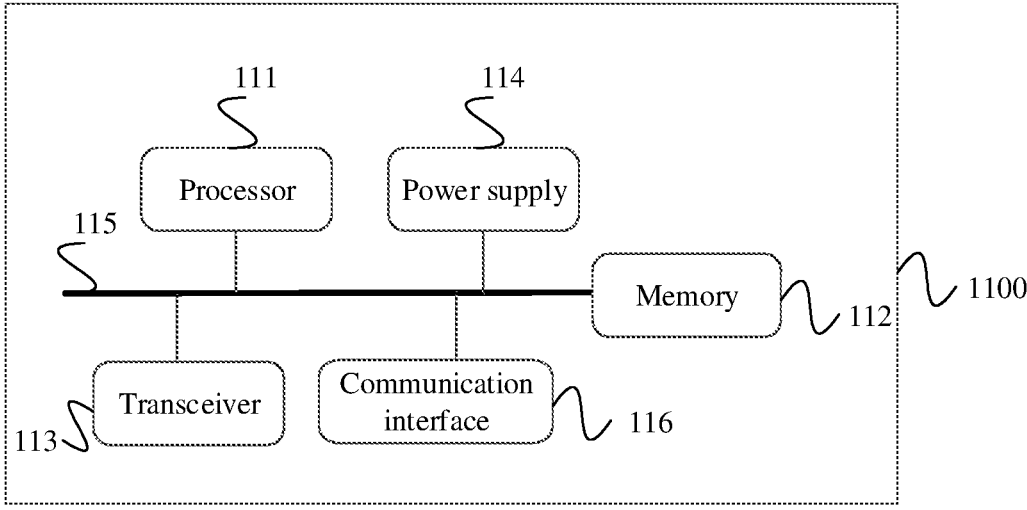
FIG. 18 is a schematic diagram of a structure of an electronic device according to an embodiment of the present disclosure.

FIG. 18 is a schematic diagram of a structure of an embodiment of an electronic device according to the present disclosure. The electronic device may be used as the scheduler according to any one of the foregoing embodiments of the present disclosure, and perform the task scheduling method performed by the scheduler. As shown in FIG. 18, the communication apparatus 1100 may include a processor 111 (for example, a CPU) and a transceiver 113. The transceiver 113 is coupled to the processor 111. The processor 111 controls a receiving and sending action of the transceiver 113. Optionally, the communication apparatus 1100 further includes a memory 112. The memory 112 may store various instructions, to complete various processing functions and implement method steps performed by a scheduler in embodiments of the present disclosure.

Optionally, the electronic device in this embodiment may further include a power supply 114, a system bus 115, and a communication interface 116. The transceiver 113 may be integrated into transmitting and receiving equipment of the electronic device, or may be an independent transceiver antenna on the electronic device. The system bus 115 is configured to implement a communication connection between components. The communication interface 116 is configured to implement connection and communication between the electronic device and another peripheral.

In this embodiment, the processor 111 is configured to be coupled to the memory 112, and read and execute the instructions in the memory 112, to implement the method steps performed by the scheduler in the foregoing method embodiments. The transceiver 113 is coupled to the processor 111. The processor 111 controls the transceiver 113 to receive and send a message.

Implementation principles and technical effects thereof are similar, and details are not described herein.

The system bus mentioned in FIG. 18 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. The communication interface is configured to implement communication between a database access apparatus and another device (such as a client, a read/write database, or a read-only database). The memory may include a RAM, and may further include a nonvolatile memory, for example, at least one magnetic disk memory.

The processor mentioned in FIG. 18 may be a general-purpose processor, including a central processing unit CPU, a network processor (NP), or the like, or may be a digital signal processor DSP, an application-specific integrated circuit ASIC, a field programmable gate array FPGA or another programmable logic device, a discrete gate or a transistor logic device, a discrete hardware component, or the like.

Optionally, an embodiment of the present disclosure further provides a readable storage medium. The storage medium stores instructions. When the instructions are run on a computer, the computer is enabled to perform the method performed by the scheduler in any one of the foregoing embodiments of the present disclosure.

Optionally, an embodiment of the present disclosure further provides a chip for running instructions. The chip is configured to perform the method performed by the scheduler in any one of the foregoing embodiments of the present disclosure.

An embodiment of the present disclosure further provides a program product. The program product includes a computer program. The computer program is stored in a storage medium. At least one processor may read the computer program from the storage medium. When executing the computer program, the at least one processor may implement the method performed by the scheduler in any one of the foregoing embodiments of the present disclosure.

In embodiments of the present disclosure, "at least one" means one or more, and "a plurality of" means two or more. "And/or" describes an association relationship between associated objects, and represents that three relationships may exist. For example, A and/or B may represent any of the following cases: Only A exists, both A and B exist, and only B exists, where A and B may be singular or plural. The character "/" usually indicates an "or" relationship between associated objects. In a formula, the character "/" indicates a "division" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, various numeric numbers in embodiments of the present disclosure are merely used for differentiation for ease of description, but are not used to limit the scope of embodiments of the present disclosure. In addition, sequence numbers of the foregoing processes do not mean execution sequences in embodiments of the present disclosure. The execution sequences of the processes should be determined based on functions and internal logic of the processes, and should not be construed as any limitation on the implementation processes of embodiments of the present disclosure.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A task scheduling method, comprising:
obtaining priorities of a plurality of tasks to be executed by a target virtual machine;
determining one or more tasks having a highest priority among the plurality of tasks based on the priorities of the plurality of tasks;
determining, from the one or more tasks having the highest priority, a first task with a minimum virtual runtime, the virtual runtime being determined based on an actual execution time of the task and a weight of the task relative to weights of other tasks to be executed, wherein the weight of each task is predetermined based on a priority of the task; and
controlling the target virtual machine to execute the first task.

2. The method according to claim 1, wherein the obtaining priorities of a plurality of tasks to be executed by a target virtual machine comprises:
determining, based on a to-be-executed task queue stored in a first scheduler of the target virtual machine, the priorities of the plurality of tasks to be executed by the target virtual machine.

3. The method according to claim 2, wherein the determining at least one top-priority task in the plurality of tasks comprises:
traversing priorities of all tasks in the to-be-executed task queue stored in the first scheduler, and determining the at least one top-priority task from the to-be-executed task queue.

4. The method according to claim 2, wherein the determining at least one top-priority task in the plurality of tasks comprises:
determining the at least one top-priority task in the plurality of tasks based on priority record information stored in the first scheduler, wherein the priority record information records priorities of all tasks in the to-be-executed task queue in the first scheduler.

5. The method according to claim 2, wherein the determining at least one top-priority task in the plurality of tasks comprises:
determining the at least one top-priority task based on a task in a queue that is stored in the first scheduler and corresponds to a top priority, wherein the first scheduler stores the to-be-executed tasks by using a plurality of queues, and each of the plurality of queues corresponds to a different priority.

6. A task scheduling apparatus, comprising at least one processor and at least one memory storing instructions that, when executed by the at least one processor, cause the task scheduling apparatus to perform operations comprising:
obtaining priorities of a plurality of tasks to be executed by a target virtual machine;
determining one or more tasks having a highest priority among the plurality of tasks based on the priorities of the plurality of tasks;
determining from the one or more tasks having the highest priority, a first task with a minimum virtual runtime, the virtual runtime being determined based on an actual execution time of the task and a weight of the task relative to weights of other tasks to be executed, wherein the weight of each task is predetermined based on a priority of the task; and
controlling the target virtual machine to execute the first task.

7. The task scheduling apparatus according to claim 6, wherein the obtaining of the priorities of the plurality of tasks to be executed by the target virtual machine comprises:
determining, based on a to-be-executed task queue stored in a first scheduler of the target virtual machine, the priorities of the plurality of tasks to be executed by the target virtual machine.

8. The task scheduling apparatus according to claim 7, wherein the obtaining of the priorities of the plurality of tasks to be executed by the target virtual machine further comprises:

traversing priorities of all tasks in the to-be-executed task queue stored in the first scheduler, and determining the at least one top-priority task from the to-be-executed task queue.

9. The task scheduling apparatus according to claim 7, wherein the obtaining of the priorities of the plurality of tasks to be executed by the target virtual machine further comprises:

determining the at least one top-priority task in the plurality of tasks based on priority record information stored in the first scheduler, wherein the priority record information records priorities of all tasks in the to-be-executed task queue in the first scheduler.

10. The task scheduling apparatus according to claim 7, wherein the obtaining of the priorities of the plurality of tasks to be executed by the target virtual machine further comprises:

determining the at least one top-priority task based on a task in a queue that is stored in the first scheduler and corresponds to a top priority, wherein the first scheduler stores the to-be-executed tasks by using a plurality of queues, and each of the plurality of queues corresponds to a different priority.

11. A non-transitory computer readable storage medium storing a computer program including instructions, that when executed by a computer, cause the computer to perform operations comprising:

obtaining priorities of a plurality of tasks to be executed by a target virtual machine;

determining one or more tasks having a highest priority among the plurality of tasks;

determining, from the one or more tasks having the highest priority, a first task with a minimum virtual runtime, the virtual runtime being determined based on an actual execution time of the task and a weight of the task relative to weights of other tasks to be executed, wherein the weight of each task is predetermined based on a priority of the task; and controlling the target virtual machine to execute the first task.

12. The non-transitory computer readable storage medium according to claim 11, wherein the obtaining of the priorities of the plurality of tasks to be executed by the target virtual machine comprises:

determining, based on a to-be-executed task queue stored in a first scheduler of the target virtual machine, the priorities of the plurality of tasks to be executed by the target virtual machine.

13. The non-transitory computer readable storage medium according to claim 12, wherein the obtaining of the priorities of the plurality of tasks to be executed by the target virtual machine further comprises:

traversing priorities of all tasks in the to-be-executed task queue stored in the first scheduler, and determining the at least one top-priority task from the to-be-executed task queue.

14. The non-transitory computer readable storage medium according to claim 12, wherein the obtaining of the priorities of the plurality of tasks to be executed by the target virtual machine further comprises:

determining the at least one top-priority task in the plurality of tasks based on priority record information stored in the first scheduler, wherein the priority record information records priorities of all tasks in the to-be-executed task queue in the first scheduler.

15. The non-transitory computer readable storage medium according to claim 12, wherein the obtaining of the priorities of the plurality of tasks to be executed by the target virtual machine further comprises:

determining the at least one top-priority task based on a task in a queue that is stored in the first scheduler and corresponds to a top priority, wherein the first scheduler stores the to-be-executed tasks by using a plurality of queues, and each of the plurality of queues corresponds to a different priority.

* * * * *